(12) United States Patent
Dandre et al.

(10) Patent No.: US 6,199,841 B1
(45) Date of Patent: Mar. 13, 2001

(54) TORQUE-DAMPING ANTI-VIBRATION DEVICE

(75) Inventors: Jacques Dandre, La Chapelle du Noyer; Vincent Salembier, Brunelles; Jacques Molet, Gohory, all of (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/544,537

(22) Filed: Apr. 6, 2000

(30) Foreign Application Priority Data

Apr. 7, 1999 (FR) .................................................. 99 04327

(51) Int. Cl.⁷ .................................. B60G 7/02; B60G 9/04
(52) U.S. Cl. ......................................................... 267/140.12
(58) Field of Search ............................. 267/141.2–141.7, 267/279–281

(56) References Cited

U.S. PATENT DOCUMENTS 5,031,885  7/1991  Schwerdt ......................... 267/141.2

FOREIGN PATENT DOCUMENTS

| 42 15 195 | 11/1993 | (DE) . |
| 0 258 103 | 3/1988 | (EP) . |
| 0 371 194 | 6/1990 | (EP) . |
| 05104922 | 4/1993 | (JP) . |
| 08233006 | 9/1996 | (JP) . |

Primary Examiner—Christopher P. Schwartz
(74) Attorney, Agent, or Firm—Marshall, O'Toole, Gerstein, Murray & Borun

(57) ABSTRACT

An anti-vibration device for damping torque designed to couple an engine with a motor vehicle chassis with a view to limiting displacements of the engine, comprising a central reinforcement simply inserted in a nest-fit between elastomer lobes projecting in the main direction of displacement inside an annular reinforcement. The lobe which is compressed when the engine produces a driving force is thicker than the others and the first reinforcement is flat perpendicular to the main direction of displacement.

10 Claims, 3 Drawing Sheets

TORQUE-DAMPING ANTI-VIBRATION DEVICE

FIELD OF THE INVENTION

The present invention relates to anti-vibration devices for damping torque.

More specifically, the invention relates to an anti-vibration device for damping torque, designed to couple an engine with a motor vehicle chassis with a view to limiting displacements of the engine in at least a first direction, this torque-damping device comprising:

first and second rigid reinforcements, which are designed to be fixed one to the engine and the other to the chassis, the second reinforcement defining a hollow interior space in which the first reinforcement is disposed with a certain amount of clearance in the first direction and in second and third directions perpendicular to one another and to said first direction, a first elastomer limiting unit which is bonded onto the second reinforcement and inserted between the first and second reinforcements in order to restrict their relative displacement in the first direction, depending on a first direction corresponding to a displacement to which the engine is subjected when it produces a driving force, the first limiting unit having a first thickness of elastomer in the interior space of the second reinforcement as measured in the first direction, and a second elastomer limiting unit which is bonded onto the second reinforcement and inserted between the first and second reinforcements in order to limit their relative displacement in the first direction, depending on a second direction opposite said first direction and corresponding to the displacement to which the engine is subjected when it produces a deceleration, the second limiting unit having a second thickness of elastomer in the interior space of the second reinforcement, measured in the first direction.

BACKGROUND OF THE INVENTION

In the known anti-vibration devices of this type, the first and second elastomer limiting units consist of two diametrically opposed arms which are joined at a central part moulded onto the first reinforcement.

These known anti-vibration devices have the following disadvantages, depending on how they are oriented relative to the displacement:

if the arms are working under a shearing action, the vibrations of the engine relative to the chassis are not appropriately filtered in the second direction (generally substantially vertical) because the anti-vibration device is of a relatively high rigidity in said second direction, if one of the elastomer arms is working under compression, the other arm is then working in traction, which has a very adverse effect on the capacity of the elastomer to withstand fatigue.

Furthermore, since only a small volume is free for mounting the anti-vibration device, the elastomer arms are short and are therefore subjected to particularly high stress, which also has an adverse effect on the capacity of the coupling device to withstand fatigue.

OBJECTS AND SUMMARY OF THE INVENTION

The specific objective of the invention is to overcome these disadvantages.

To this end, the invention proposes an anti-vibration device of the type outlined above, essentially characterised in that:

the first reinforcement is of a substantially flat shape in the second and third directions, the first reinforcement is simply inserted between the first and second elastomer limiting units, without any adhesion between the first reinforcement and said first and second limiting units, and the first thickness of elastomer is greater than the second thickness of elastomer.

As a result of these features, each of the first and second limiting units works solely under compression which avoids the tensile stress detrimental to the capacity of the elastomer to withstand fatigue.

Furthermore, the first elastomer limiting unit, which is the one subjected to the greater stress, is also the one with the biggest elastomer thickness in the main direction of displacement, which makes the anti-vibration device more efficient.

Finally, the vibrations of the engine in the second direction are efficiently filtered, as are vibrations of the engine in the third direction, since the anti-vibration device is of a very low rigidity in these directions, due to:

the biasing of the rubber under shearing, and the relatively large elastomer thickness of the first limiting unit against which the first reinforcement is supported for most of the time, which imparts quite good flexibility to this first limiting unit in the second and third directions.

It should be pointed out that the fact that the first reinforcement is not adhered in the second and third directions also makes it easier to accommodate mounting tolerances, particularly in the third direction.

In preferred embodiments of the invention, one and/or the other of the following features may optionally be incorporated:

the first reinforcement is inserted in a nest-fit between the first and second elastomer limiting units in contact with the first and second limiting units;

the first reinforcement is clamped between the first and second elastomer limiting units, thereby inducing an initial stress in the first and second limiting units in the first direction;

the second reinforcement is annular in shape, having an interior face which is lined with an elastomer body comprising the first and second limiting units;

the first limiting using consists of an elastomer lobe which projects into the interior space of the second reinforcement along a central axis parallel with the first direction;

the second limiting unit comprises second and third elastomer lobes which project into the interior space of the second reinforcement parallel with the first direction, opposite the first lobe, these second and third lobes being disposed on either side of the central axis of the first lobe, and the first reinforcement is designed in a shape similar to an arched tile with a concave aspect directed towards the first lobe;

the first reinforcement has a bore extending in the third direction which is designed to receive a bearing rod permanently jointed either to the engine or to the chassis, said first reinforcement forming a boss on a level with this bore which projects between the second and third elastomer lobes towards an elastomer stop moulded in a single piece with these second and third lobes and which is disposed in a recess between these lobes;

the first reinforcement is made by moulding and has stops which are directed in two opposite direction parallel with the third direction and which co-operate with at least one of the first and second elastomer limiting units in order to restrict relative displacements of the first and second reinforcements parallel with the third direction, these stops being offset from one another perpendicularly to said third direction so that, viewed in a projection parallel with this third direction, said stops do not overlap at any point which means that the first reinforcement can be moulded in a two-part mould and de-moulded parallel with the third direction;

the stops frame one of the first and second elastomer limiting units in order to restrict relative displacements of the first and second reinforcements parallel with the third direction;

the stops are disposed on two opposing faces belonging to the same reinforcement and co-operate one with the first elastomer limiting unit and the other with the second elastomer limiting unit in order to restrict relative displacements of the first and second reinforcements parallel with the third direction.

Another objective of the invention is a motor vehicle comprising an engine coupled with a chassis by at least one torque-damping device of the type defined above.

BRIEF DESCRIPTION OF THE DRAWINGS

Other features and advantages of the invention will become clear from the description of several embodiments below, given by way of illustration and not restrictive in any respect, and with reference to the appended drawings.

Of the drawings.

MORE DETAILED DESCRIPTION

The same references are used in the different drawings to denote the same or similar elements.

Figure 1:
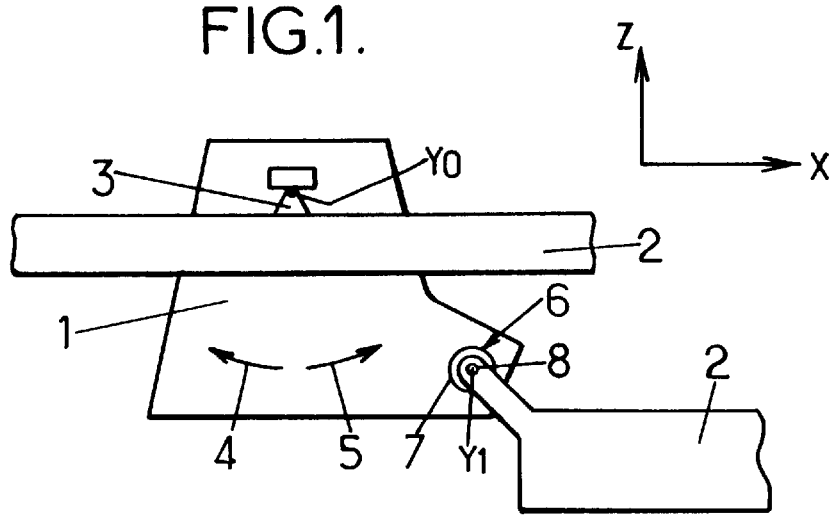
FIG. 1 is a schematic view of a motor vehicle engine coupled with the body of said vehicle by means of a pendulum suspension comprising a torque-damping anti-vibration device as proposed by the invention.

FIG. 1 is a schematic illustration of a motor vehicle 1 coupled with the chassis 2 of said vehicle by means of a pendulum suspension comprising:

anti-vibration bearings 3, generally hydraulic, which support the engine whilst allowing said engine to be displaced by pivoting about an axis Y0, the engine 1 being displaced in a first direction 4 when the engine produces a driving force and in a second direction 5 opposite the first direction 4 when the engine causes the vehicle to decelerate, and at least one torque-damping, anti-vibration coupling device 6 which limits these displacements. This coupling device 6 is preferably designed as a sleeve, which is nested without any clearance in a cylindrical housing 7 permanently joined to the engine and which is coupled with the chassis of the vehicle by means of a bearing rod 8 extending along an axis Y1 parallel with the above-mentioned axis Y0.

The position in which the housing 7 is arranged is such that the displacements of the engine in directions 4 and 5 mentioned above cause the housing 7 to be displaced in a first direction X which is preferably substantially horizontal.

Clearly the coupling device 6 could also be mounted on a bearing rod 8 permanently joined to the engine 1 in a housing 7 permanently joined to the chassis 2.

Figure 2:
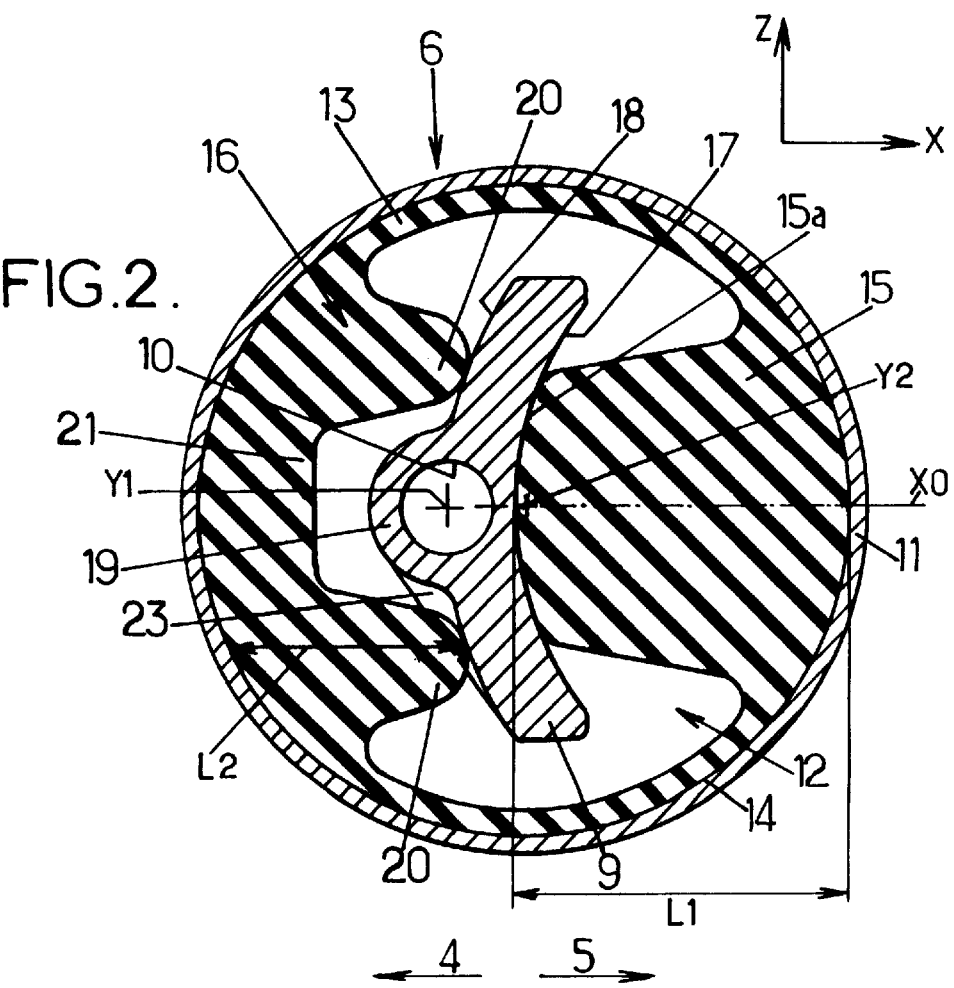
FIG. 2 is a view in vertical section of a first embodiment of the torque-damping device of FIG. 1 proposed by the invention.

As illustrated in detail in FIG. 2, the anti-vibration coupling device 6 comprises:

a first rigid metal reinforcement 9 having a central bore 10 extending along the axis Y1 and designed to receive the bearing rod 8, this first reinforcement preferably being of a substantially flattened shape parallel with the axis Y1 and in a second direction Z (preferably substantially vertical) which is perpendicular to the first direction X and the axis Y1, a second rigid metal reinforcement 11 which is preferably of an annular shape and defines an interior hollow space 12 in which the first reinforcement 9 is disposed leaving a certain amount of clearance in the first and second directions X, Z, this second reinforcement 11 preferably being of a cylindrical shape centred on an axis Y2 which is offset from the axis Y1 mentioned above, and an elastomer body 13 which lines the interior face 14 of the second reinforcement 11 being bonded onto this interior face, the elastomer body 13 forming first and second elastomer limiting units 15, 16 which restrict the displacements of the second reinforcement 11 in the first and second directions 4, 5 respectively (the first limiting unit 15 works when the engine 1 produces a driving force whilst the second limiting unit 16 works when the engine 1 is braking the vehicle).

By preference, the first elastomer limiting unit 15 is designed as a single lobe which projects into the hollow interior space 12 in the direction 4 as far as a convex end face 15a arranged in contact with a first face 17 of the first reinforcement 9. This lobe 15 extends along a central axis X0 parallel with the axis X and has a thickness L1 of elastomer in the interior space 12, measured along the axis X0.

The first reinforcement 9 is preferably in the shape of an arched tile so that the first face 17 of this reinforcement is concave in shape, the concave aspect being directed towards the lobe 15 and complementing the shape of the end face 15a. Advantageously, the shape of the first face 17 of the reinforcement 9 is such that it is part of a cylinder described in space centred on an axis parallel with the axis Y1 and intersecting the horizontal axis X0.

The first reinforcement 9 also has a second, convex face 18, opposing the first face 17 and which, for the most part, is substantially parallel with the first face 17. On a level with the bore 10, the second face 18 has a boss 19 which forms a rib parallel with the axis Y1 and which projects in the direction 4 parallel with the direction X.

This second face 18 of the reinforcement 9 is in contact with two elastomer lobes 20 forming part of the second limiting unit 16, each of these lobes 20 projecting into the interior space 12 of the second reinforcement in the direction 5 parallel with the direction X, these lobes 20 being offset from the central axis X0 of the lobe 15 above and below it respectively.

The reinforcement 9 is therefore mounted in the reinforcement 11 by a simple nest-fit between the lobes 15 and 20, optionally with a certain clamping action which applies an initial stress to the lobes 15, 20 in the direction X.

Each of the lobes 20 has a thickness L2 of elastomer parallel with the direction X, starting from the reinforcement 11. This thickness L2 is smaller than the thickness L1 mentioned above, which is not a problem since the lobe 15 is biased to a much greater degree than the lobes 20.

However, it should be pointed out that because the reinforcement 9 is of an arched shape and because the lobes 20 are offset from the central axis of the lobe 15, the elastomer thickness L2 of the lobes 20 is nevertheless relatively big.

Furthermore, the elastomer limiting unit 16 also has a stop 21 formed by a relatively thick part of the elastomer body. This stop 21 is disposed between the lobes 20 facing the boss 19 of the reinforcement 9 so as to co-operate with this boss when the reinforcement 11 reaches the end of its travel in the direction 5.

Figure 3:
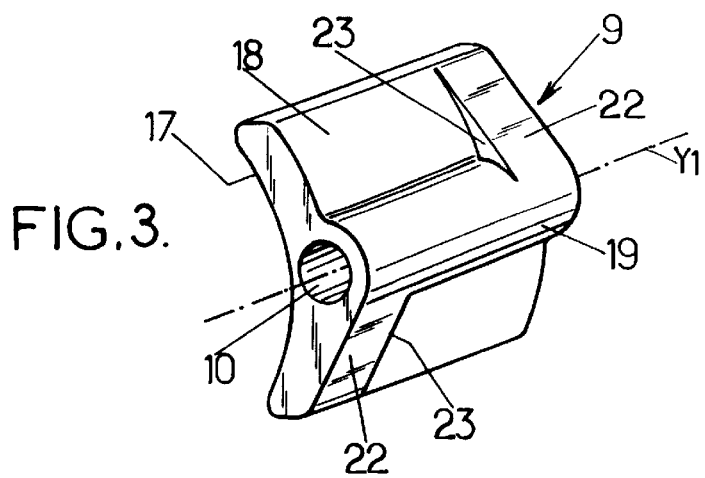
FIG. 3 is a perspective view of the central reinforcement of the torque-damping device of FIG. 2, FIGS. 4 and 5 are perspective views of the central reinforcement of the torque-damping anti-vibration device proposed by the invention.

Finally, as illustrated in FIGS. 2 and 3, the second face 18 of the reinforcement 9 has two upstanding parts 22 arranged respectively at the two ends of the reinforcement 9 along the axis Y1. These upstanding parts form stops 23 which are designed to co-operate respectively with the lobes 20 in order to restrict displacements of the first reinforcement 9 parallel with the axis Y1.

By preference, the reinforcement 9 is made by moulding, in particular from a light alloy, and the two upstanding parts 22 are offset from one another perpendicularly to the axis Y1 in order to simplify the mould used to make the reinforcement 9 as far as possible (the reinforcement 9 may in fact be made from a two-part mould).

In particular, as may be seen from FIG. 3, the two upstanding parts 22 may be arranged so that one is above the boss 19 and the other is below the boss 19, each of the stops 23 co-operating with one of the lobes 20.

Figure 4:
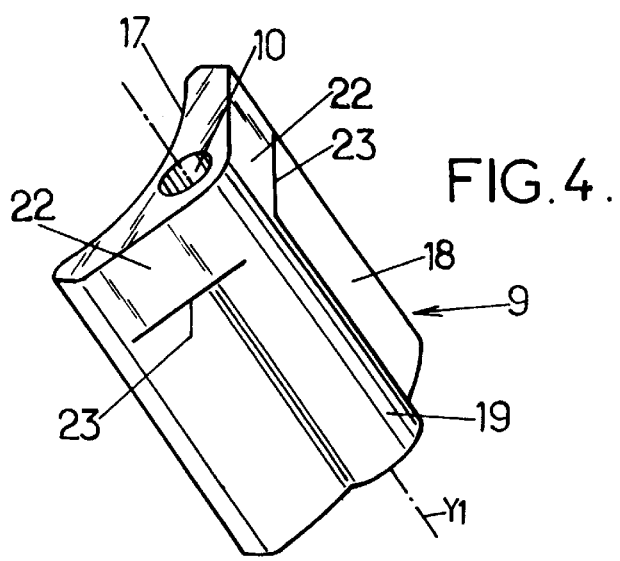
Figure 5:
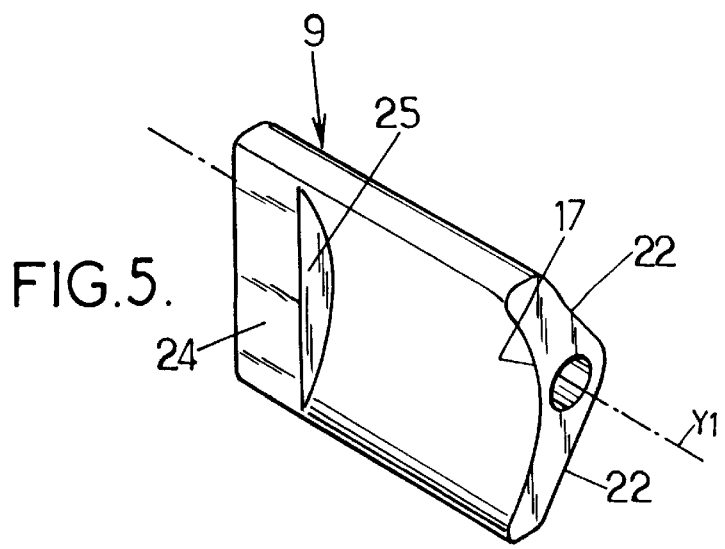

In another embodiment, as illustrated in FIGS. 4 and 5, the second face 18 of the reinforcement 9 could have two upstanding parts 22 similar to those described above but provided at a same end of said reinforcement, these upstanding parts being disposed above and below the boss 19 respectively, in which case the stops 23 of these upstanding parts will co-operate with the lobes 20 to restrict displacement of the reinforcement 9 in one direction only, parallel with the axis Y1.

In this case, the first face 17 of the reinforcement 9 then has, at the end opposite the upstanding parts 22, a flat portion 24 which forms a stop 25 directed parallel with the axis Y1 in the direction opposite the stops 23 mentioned above. This stop 25 co-operates with the lobe 15 to limit displacement of the reinforcement 9 parallel with the axis Y1 in the direction opposite the direction in which the stops 23 act.

Figure 6:
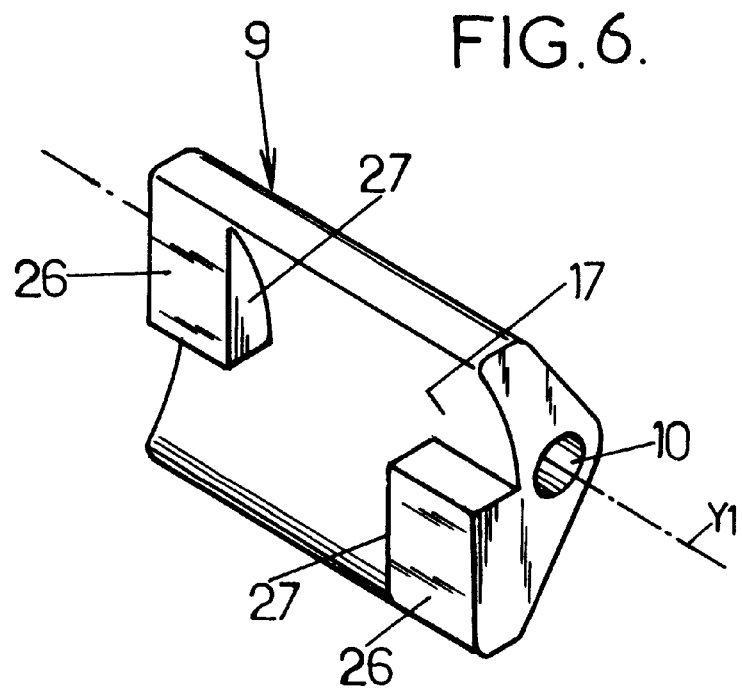
FIGS. 6 and 7 are views similar to that of FIG. 5, showing third and fourth embodiments of the invention respectively.

In another embodiment illustrated in FIG. 6, the first face 17 of the reinforcement 9 could also have only two upstanding parts 26, vertically offset and forming two oppositely directed stops 27 parallel with the axis Y1, which co-operate with the lobe 15 to restrict displacements of the reinforcement 11 parallel with the axis Y1.

In this case, because the upstanding parts 26 are offset perpendicular to the axis Y1, i.e. because said upstanding parts 26, as viewed in a projection parallel with the axis Y1, do not overlap with one another, a simple two-part mould can be used to make the reinforcement 9.

Figure 7:
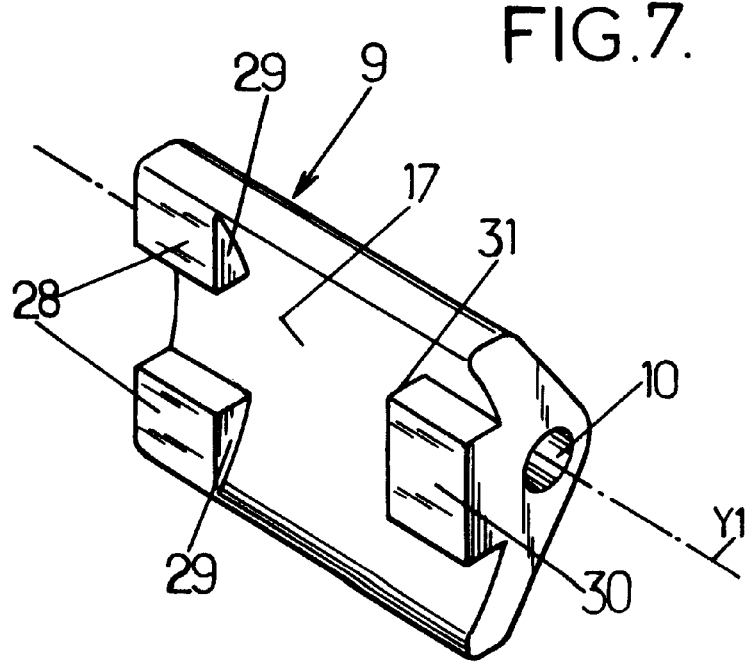

In yet another embodiment, illustrated in FIG. 7, the first face 17 of the reinforcement 9 could have:

two upstanding parts 28 at one of its longitudinal ends, these upstanding parts defining stop faces 29 directed parallel with the axis Y1, the upstanding parts 28 being disposed close to the top and bottom ends of the reinforcement 9, and an upstanding part 30 disposed at the opposite longitudinal end of the reinforcement 9, this upstanding part defining a stop face 31 which is directed parallel with the axis Y1 and facing the stops 29 mentioned above, the upstanding part 30 being disposed substantially on a level with the bore 10 of the reinforcement 9 and the stops 29, 31 co-operating with the elastomer lobe 15 to restrict displacements of the reinforcement 11 parallel with the axis Y1.

In this embodiment, the upstanding part 30 is vertically offset from the upstanding parts 28, i.e. it does not overlap with the upstanding parts 28 as viewed in a projection parallel with the axis Y1 so that the reinforcement 9 cam be made from a simple two-part mould.

We claim:

1. An anti-vibration device for damping torque, designed to couple an engine with a motor vehicle chassis with a view to limiting displacements of the engine in at least a first direction, this coupling device comprising:

first and second rigid reinforcements, which are designed to be fixed one to the engine and the other to the chassis, the second reinforcement defining a hollow interior space in which the first reinforcement is disposed with a certain amount of clearance in the first direction and in second and third directions perpendicular to one another and to said first direction, a first elastomer limiting unit which is bonded onto the second reinforcement and inserted between the first and second reinforcements in order to restrict their relative displacement in the first direction, depending on a first direction corresponding to a displacement to which the engine is subjected when it produces a driving force, the first limiting unit having a first thickness of elastomer in the interior space of the second reinforcement as measured in the first direction, and a second elastomer limiting unit which is bonded onto the second reinforcement and inserted between the first and second reinforcements in order to limit their relative displacement in the first direction, depending on a second direction opposite said first direction and corresponding to the displacement to which the engine is subjected when it produces a deceleration, the second limiting unit having a second thickness of elastomer in the interior space of the second reinforcement, measured in the first direction;

wherein the first reinforcement is of a substantially flat shape in the second and third directions, wherein the first reinforcement is simply inserted between the first and second elastomer limiting units without any bonding between the first reinforcement and said first and second limiting units, wherein the first elastomer thickness is greater than the second elastomer thickness, wherein the second reinforcement is annular in shape having an interior face lined with an elastomer body comprising the first and second limiting units, and wherein the first limiting unit comprises an elastomer lobe which projects into the interior space of the second reinforcement along a central axis parallel with the first direction.

2. A device as claimed in claim 1, in which the first reinforcement is disposed in a nest-fit between the first and second elastomer limiting units in contact with these first and second limiting units.

3. A device as claimed in claim 2, in which the first reinforcement is clamped between the first and second elastomer limiting units thereby applying an initial stress to said first and second limiting units in the first direction.

4. A device as claimed in claim 1, in which the second limiting unit comprises second and third elastomer lobes which project into the interior space of the second reinforcement parallel with the first direction, opposite the first lobe, these second and third lobes being arranged on either side of the central axis of the first lobe and the first reinforcement being designed of an arched-tile shape with a concave aspect directed towards the first lobe.

5. A device as claimed in claim 4, in which the first reinforcement has a bore extending in the third direction which is designed to receive a bearing rod permanently joined either to the engine or to the chassis, said first reinforcement forming a boss on a level with this bore which projects between the second and third elastomer lobes towards an elastomer stop which is formed in a single piece with these second and third lobes and which is arranged in a recess between these lobes.

6. A motor vehicle comprising an engine coupled with a chassis by at least one torque-damping device as claimed in claim 1.

7. An anti-vibration device for damping torque, designed to couple an engine with a motor vehicle chassis with a view to limiting displacements of the engine in at least a first direction, this coupling device comprising:

first and second rigid reinforcements, which are designed to be fixed one to the engine and the other to the chassis, the second reinforcement defining a hollow interior space in which the first reinforcement is disposed with a certain amount of clearance in the first direction and in second and third directions perpendicular to one another and to said first direction, a first elastomer limiting unit which is bonded onto the second reinforcement and inserted between the first and second reinforcements in order to restrict their relative displacement in the first direction, depending on a first direction corresponding to a displacement to which the engine is subjected when it produces a driving force, the first limiting unit having a first thickness of elastomer in the interior space of the second reinforcement as measured in the first direction, and a second elastomer limiting unit which is bonded onto the second reinforcement and inserted between the first and second reinforcements in order to limit their relative displacement in the first direction, depending on a second direction opposite said first direction and corresponding to the displacement to which the engine is subjected when it produces a deceleration, the second limiting unit having a second thickness of elastomer in the interior space of the second reinforcement, measured in the first direction;

wherein the first reinforcement is of a substantially flat shape in the second and third directions, wherein the first reinforcement is simply inserted between the first and second elastomer limiting units without any bonding between the first reinforcement and said first and second limiting units, and wherein the first reinforcement is made by moulding and has stops which face in two opposite directions parallel with the third direction and which co-operate with at least one of the first and second elastomer limiting units in order to restrict relative displacements of the first and second reinforcements parallel with the third direction, these stops being offset from one another perpendicularly to said third direction so that, viewed in a projection parallel with this third direction, said stops to not overlap at any point, so that the first reinforcement can be moulded in a two-part mould and de-moulded parallel with the third direction.

8. A device as claimed in claim 7, in which the stops frame one of the first and second elastomer limiting units in order to restrict relative displacements of the first and second reinforcement parallel with the third direction.

9. A device as claimed in claim 7, in which the stops are disposed on opposing faces belonging to the first reinforcement and co-operate one with the first elastomer limiting unit and the other with the second elastomer limiting unit in order to restrict relative displacements of the first and second reinforcements parallel with the third direction.

10. A motor vehicle comprising an engine coupled with a chassis by at least one torque-damping device as claimed in claim 7.

* * * * *